(12) United States Patent
Dobson

(10) Patent No.: US 7,012,921 B2
(45) Date of Patent: *Mar. 14, 2006

(54) METHOD AND SYSTEM FOR HANDLING ASYNCHRONOUS TRANSFER MODE (ATM) CALL SET-UPS

(75) Inventor: Bradford J. Dobson, Plano, TX (US)

(73) Assignee: Fujitsu Limited, Kawasaki (JP)

( * ) Notice: Subject to any disclaimer, the term of this patent is extended or adjusted under 35 U.S.C. 154(b) by 16 days.

This patent is subject to a terminal disclaimer.

(21) Appl. No.: 10/715,644

(22) Filed: Nov. 17, 2003

(65) Prior Publication Data

US 2004/0242237 A1 Dec. 2, 2004

Related U.S. Application Data

(63) Continuation of application No. 09/658,564, filed on Sep. 8, 2000, now Pat. No. 6,650,643.

(51) Int. Cl.
*H04L 12/56* (2006.01)
*H04L 12/28* (2006.01)

(52) U.S. Cl. ............... 370/395; 370/229; 370/230; 370/234; 370/235; 455/452; 455/453

(58) Field of Classification Search ............... 370/395, 370/229, 230, 234, 235, 409, 269; 455/452, 455/453
See application file for complete search history.

(56) References Cited

U.S. PATENT DOCUMENTS

| | | | |
|---|---|---|---|
| 5,043,979 A | 8/1991 | Sakurai et al. ............... 370/60 |
| 5,583,857 A * | 12/1996 | Soumiya et al. ............ 370/233 |
| 5,697,054 A | 12/1997 | Anderson .................... 455/524 |
| 5,812,526 A * | 9/1998 | Chang et al. ............... 370/230 |
| 6,072,799 A * | 6/2000 | Cheung et al. .......... 370/236.1 |
| 6,081,506 A * | 6/2000 | Buyukkoc et al. .......... 370/235 |
| 6,091,730 A * | 7/2000 | Biegaj et al. ............ 370/395.2 |
| 6,111,871 A | 8/2000 | Chen et al. ................. 370/349 |
| 6,111,881 A * | 8/2000 | Soncodi ................. 370/395.32 |
| 6,324,166 B1 * | 11/2001 | Yokoyama et al. ......... 370/234 |
| 6,400,685 B1 | 6/2002 | Park .......................... 370/232 |
| 6,650,643 B1 * | 11/2003 | Dobson ..................... 370/229 |

* cited by examiner

*Primary Examiner*—Marceau Milord
(74) *Attorney, Agent, or Firm*—Baker Botts L.L.P.

(57) ABSTRACT

A method for handling call set-ups in a telecommunications network. The method includes receiving a request to set up a call. A dynamic load value is compared to a load threshold. The call is allowed to be set up when the dynamic load value is less than the load threshold.

20 Claims, 2 Drawing Sheets

METHOD AND SYSTEM FOR HANDLING ASYNCHRONOUS TRANSFER MODE (ATM) CALL SET-UPS

CROSS REFERENCE TO RELATED APPLICATION

This application is a continuation of U.S. patent application Ser. No. 09/658,564 filed Sep. 8, 2000 now U.S. Pat. No. 6,650,643 and entitled "Method and System For Handling Asynchronous Transfer Mode (ATM) Call Set-Ups".

TECHNICAL FIELD OF THE INVENTION

This invention relates generally to the field of telecommunications networks and more particularly to a method and system for handling asynchronous transfer mode (ATM) call set-ups.

BACKGROUND OF THE INVENTION

Telecommunications networks have traditionally been circuit-switch networks that have transmission paths dedicated to specific users for the duration of a call and that employ continuous, fixed-bandwidth transmission. Due to growth in data traffic created by the Internet and its related technologies, however, telecommunications networks are being moved to a packet-switching transmission model. Packet-switch networks provide a large range of digital services, from data to video to basic voice telephony. Packet-switch networks can allow dynamic bandwidth and may be connectionless with no dedicated path or connection-oriented with virtual circuits and dedicated bandwidth along a predetermined path.

Asynchronous transfer mode (ATM) is a connection-oriented packet-switching technology in which information is organized into small, fixed length cells. ATM carries data asynchronously, automatically assigning data cells to available time slots on demand to provide maximum throughput. Compared with other network technologies, ATM provides large increases in maximum supported bandwidth, designed-in asynchronous traffic support, support for multiple types of traffic such as data, video, and voice transmissions on shared communication lines, and virtual networking capabilities, which increase bandwidth utilization with high quality of service and ease network administration.

However, currently implemented methods for handling ATM call set-up requests are inefficient. For example, when a calling party requests a call set-up, a conventional ATM switch may fail to respond to the request before a time-out period expires. When this occurs, the calling party cannot decide how to proceed until after the time-out period, which may result in unnecessary delays in signal processing.

In addition, if the ATM switch eventually does set up a call after the time-out period has expired, the call must be torn down. Tearing down a call requires additional messages between the calling party, the ATM switch and the called party, which utilizes bandwidth and processing power resulting in decreased efficiency for the system.

SUMMARY OF THE INVENTION

The present invention provides an improved method and system for handling asynchronous transfer mode (ATM) call set-ups that substantially eliminate or reduce disadvantages and problems associated with previous systems and methods. In particular, a decision regarding a switch's ability to handle a new call set-up request is provided based on continuously updated data for the switch, allowing a calling party to make a relatively quick decision as to how to proceed if the request is denied.

In accordance with one embodiment of the present invention, a method for handling call set-ups in a telecommunications network. The method includes receiving a request to set up a call. A dynamic load value is compared to a load threshold. The call is allowed to be set up when the dynamic load value is less than the load threshold.

More particularly, in accordance with a particular embodiment of the present invention, the dynamic load value comprises a current load value. An average load value is compared to the load threshold when the current load value is greater than or equal to the load threshold. The call is allowed to be set up when the average load value is less than the load threshold. The request to set up the call is rejected when the current load value is greater than or equal to the load threshold and the average load value is greater than or equal to the load threshold.

Technical advantages of one or more embodiments the present invention include providing an improved method and system for handling ATM call set-ups. In particular, a decision regarding the switch's ability to handle a new call set-up request is provided based on continuously updated data for the switch. As a result, a calling party is notified relatively quickly if the request is rejected.

Accordingly, the calling party may make an informed decision as to how to proceed without having to wait for a time-out period. In addition, the reduced efficiency associated with the use of resources for tearing down calls that are set up after the time-out period is eliminated.

Another technical advantage of one or more embodiments the present invention includes providing an improved ATM switch or other ATM node. In particular, a processing or other suitable card for the switch tracks both current and average load values for the switch, which may be used to handle call set-up requests. As a result, the switch does not become overloaded with a sustained heavy load of call set-ups, but is still able to handle short bursts of requests without rejection. Accordingly, the switch can effectively manage overflow scenarios without running out of internal resources, such as memory.

Other technical advantages of the present invention will be readily apparent to one skilled in the art from the following figures, description, and claims.

BRIEF DESCRIPTION OF THE DRAWINGS

For a more complete understanding of the present invention and its advantages, reference is now made to the following description taken in conjunction with the accompanying drawings, wherein like reference numerals represent like parts, in which.

DETAILED DESCRIPTION OF THE INVENTION

Figure 1:
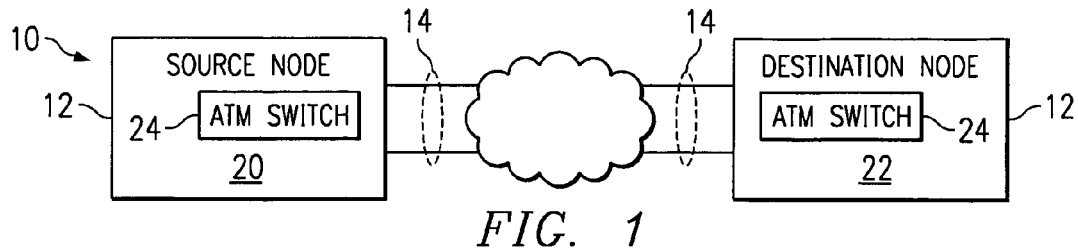
FIG. 1 is a block diagram illustrating a telecommunications network for transmitting asynchronous transfer mode (ATM) and other traffic in accordance with one embodiment of the invention.

FIG. 1 is a block diagram illustrating a telecommunications network 10 for transmitting asynchronous transfer mode (ATM) and other traffic in accordance with one embodiment of the invention. Although the described embodiment of the present invention relates to ATM switching, it will be understood that the present invention may be implemented in connection with any other suitable packet-based switching without departing from the scope of the present invention.

The telecommunications network 10 transmits audio, video, data, and other suitable types of information and/or a combination of different types of information between remote locations. The telecommunications network 10 may comprise any suitable wireline or wireless system, or combination thereof, operable to support communication between various network elements. For example, the network 10 may comprise a public switched telephone network, an integrated services digital network, a local area network, a wide area network, a global computer network, such as the Internet or other dedicated switched network, or other communication system or combination of communication systems at one or more locations.

Referring to FIG. 1, the telecommunications network 10 comprises a plurality of nodes 12 interconnected by a transmission line 14. The nodes 12 may comprise a network element capable of communicating traffic in the telecommunications network 10. The nodes 12 may comprise a switch, router, add/drop multiplexer or other suitable device capable of directing traffic in the telecommunications network 10.

The transmission line 14 provides a physical interface between the nodes 12. The physical interface is defined by the bandwidth of the connecting transmission line 14 which may be a DS-3 link, an OC-3 line, an OC-12 line or any other suitable type of line having similar or other bandwidths. The transmission line 14 may comprise optical fiber, cable, twisted wire, or other suitable wireline or wireless link capable of transporting traffic between two nodes 12.

For the embodiment of FIG. 1, the telecommunications network 10 comprises a source node 20 and a destination node 22. The nodes 20 and 22 are each ATM elements or multi-protocol elements having functionality for processing ATM traffic in which information is organized into small, fixed length cells. As used herein, "each" means every one of at least a subset of the identified items. The ATM cells are routed by the source and destination nodes 20 and 22 using a switching label included in the ATM cell. The source and destination nodes 20 and 22 each comprise an ATM switch 24 that is operable to receive ATM traffic, perform address translation for switching labels in the traffic, and transmit the traffic in accordance with the translated switching labels.

Figure 2:
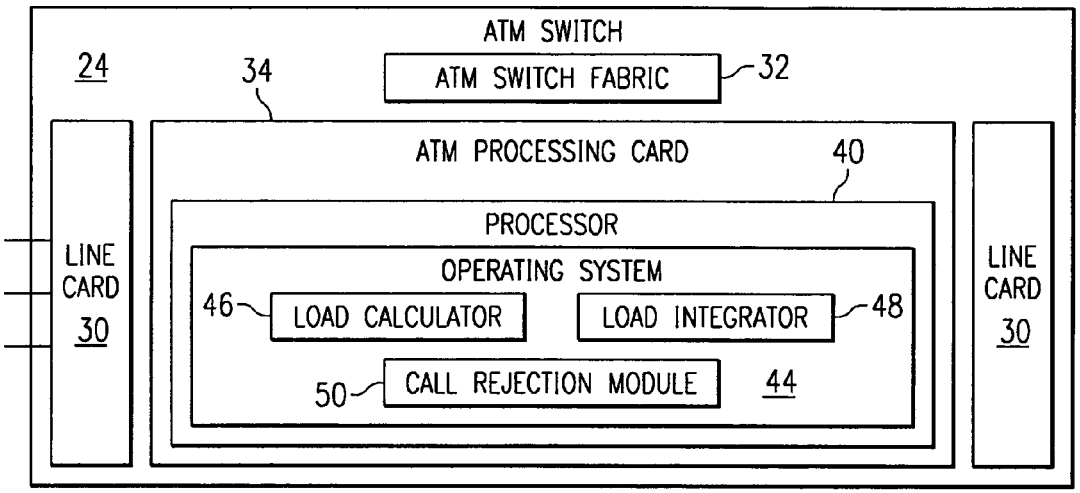
FIG. 2 is a block diagram illustrating details of the ATM switch of FIG. 1 in accordance with one embodiment of the present invention.

FIG. 2 is a block diagram illustrating details of the ATM switch 24 in accordance with one embodiment of the present invention. In this embodiment, the ATM switch 24 comprises a plurality of line cards 30, an ATM switch fabric 32, and an ATM processing card 34. The components 30, 32 and 34 of the ATM switch 24 are interconnected by one or more networks or backplanes within the ATM switch 24.

Each line card 30 may comprise one or more physical layer devices operable to perform framing and other functions on incoming and outgoing signals. Each line card 30 may also comprise one or more overhead processors operable to extract overhead information from incoming signals and to insert overhead information into outgoing signals.

The switch fabric 32 may comprise any suitable telecommunications switch capable of routing ATM or other suitable traffic in the telecommunications network 10. The switch fabric 32 may be implemented in part by logic stored on a computer-processable medium. The logic may be encoded in hardware and/or software instructions stored in a random access memory, a read only memory, or other suitable computer-processable media.

The switch fabric 32 is operable to switch traffic from a line card 30 receiving traffic to a line card 30 transmitting traffic. In switching traffic between the line cards 30, the switch fabric 32 is operable to perform queue management. The switch fabric 32 is also operable to provide other suitable functions for the switch 24.

In operation, the switch 24 receives a data signal on an input port of a line card 30 and the switch fabric 32 switches the data signal to an output port of another line card 30 in the switch 24. The switch fabric 32 performs aggregation, switching, and/or multiplexing functions for the data signal. As part of the switching function, the switch fabric 32 identifies an output line card 30 with the appropriate output port for an incoming data signal. After identifying the output line card 30, the switch fabric 32 provides the data signal to the output line card 30 which transmits the data signal over the output port.

The processing card 34 comprises a processor 40 which comprises an operating system 44. The processing card 34 is operable to handle requests from the line cards 30 to set up and tear down calls. The processing card 34 is also operable to execute an ATM protocol set, such as an ATM signaling protocol, an ATM protocol, and any other suitable protocol.

According to the illustrated embodiment, the operating system 44 comprises a load calculator 46, a load integrator 48 and a call rejection module 50. The load calculator 46 is operable to perform a load calculator task that may be used to determine a current load for the processor 40. The load integrator 48 is operable to calculate a current load and an average load for the processor 40 based on the result from the load calculator 46 performing the load calculator task. The call rejection module 50 is operable to compare the current load and average load calculated by the load integrator 48 to a load threshold and to determine whether to allow or reject a call set-up request from a line card 30 based on the comparison.

The load integrator 48 is operable to calculate a plurality of dynamic loads for the processor 40. The dynamic loads may comprise, for example, the current load, the average load and an estimated load. The current load comprises the most recently calculated load on the processor 40. The average load comprises an average of a specified number of previously calculated loads on the processor 40 which may or may not include the current load and/or any number of estimated loads. The estimated load may comprise any suitable estimate of a load on the processor 40 for any suitable time period. The dynamic loads are dynamic in that the loads are calculated substantially continuously in order to provide updated information regarding the load on the processor 40 for use in handling requests from line cards 30 to set up calls.

The load calculator 46, the load integrator 48 and the call rejection module 50 may each be implemented by logic stored on a computer-processable medium. The logic may be encoded in hardware and/or software instructions stored in a random access memory, a read only memory, or other suitable computer-processable media. It will be understood that the functionality of the load calculator 46, the load integrator 48 and the call rejection module 50 may be suitably interchanged without departing from the scope of the present invention. For example, the functionality of these components 46, 48 and 50 may be included in a single component of the processing card 34 or may be otherwise divided between two or more components.

In operation, the load calculator 46 is calibrated by locking out all tasks for the processing card 34 other than those performed by the load calculator 46. It will be understood, however, that the load calculator 46 may lock out a specified subset of tasks without departing from the scope of the present invention.

After the locking out the other tasks, the load calculator 46 retrieves a start time for the calibration from the processor 40. The load calculator 46 then repeatedly performs a load calculator task. The load calculator task comprises any task which may be performed repetitively by the load calculator 46 in order to determine a load for the processor 40. For example, the load calculator task may comprise a counter loop which increments a counter with each iteration. After repeating the load calculator task for a period of time, the load calculator 46 retrieves an end time for the calibration from the processor 40.

The load calculator 46 calculates an optimal load for the processor 40 based on the start time, the number of times the load calculator task was performed, and the end time. For example, the optimal load may comprise the number of load calculator tasks performed per second. To calculate this optimal load, the load calculator 46 subtracts the start time from the end time to obtain the number of seconds that the calibration process lasted. The load calculator 46 then divides the number of load calculator tasks performed by the load calculator 46 during the calibration process by the number of seconds that the calibration process lasted. This yields the optimal load.

After calculating the optimal load, the load calculator 46 unlocks the previously locked out tasks. The load calculator 46 is then initialized in order to begin functioning in a manner that allows the calculation of a current and average load for the processor 40. For example, in the embodiment in which the load calculator task comprises incrementing a counter, the load calculator 46 may be initialized by setting the counter to zero. After being initialized, the load calculator 46 begins to perform the load calculator task repeatedly.

The load integrator 48 calculates an average load for a pre-defined time interval by averaging a plurality of loads for a number of shorter, pre-defined time periods. Thus, for example, each load may correspond to the load on the processor 40 over a time period of 0.1 seconds, while an average load may correspond to an average of the loads on the processor 40 over a time interval of five seconds. For this exemplary embodiment, the average load is based on the fifty most recent loads. It will be understood that the pre-defined time periods for calculating the loads and the pre-defined time intervals for calculating the average load may comprise any suitable amounts of time capable of allowing the processing card 34 to accept a short burst of call set-up requests while the ATM switch 24 is able to process allowed call set-ups within time requirements for the network 10. The pre-defined time period and the pre-defined time interval may be stored in the load integrator 48 or in any suitable component of the processing card 34.

According to one embodiment, the load integrator 48 comprises an integration array operable to store fifty loads, including forty-nine prior loads and one current load. The load integrator 48 in this embodiment may be initialized by filling the integration array with fifty estimated loads.

Once the load integrator 48 is initialized, the load integrator 48 issues a re-start instruction to the load calculator 46, causing the load calculator 46 to be initialized and then to continue to perform the load calculator task. Thus, for example, the counter of the load calculator 46 may be set to zero and the load calculator 46 may then begin incrementing the counter again.

After waiting for a pre-defined time period, such as 0.1 seconds, the load integrator 48 retrieves a result from the load calculator 46 based on the load calculator task. For example, the load integrator 48 retrieves the value of the counter. Alternatively, the load integrator 48 receives the result from the load calculator 46. The load integrator 48 calculates the current load on the processor 40 based on the pre-defined time period and the result from the load calculator 46, as described in more detail below in connection with FIG. 4. The load integrator 48 then discards the oldest prior load and stores the current load in the integration array.

After calculating the current load, the load integrator 48 calculates the average load for a pre-defined time interval. For example, the load integrator 48 calculates the average load by averaging the forty-nine prior loads and the current load stored in the integration array. After calculating the average load, the load integrator 48 issues a re-start instruction to the load calculator 46 in order to begin the process for determining the next current load. In response to this instruction, the load calculator 46 resets the counter to zero and begins incrementing the counter again. Thus, the load integrator 48 may provide continuously updated information regarding the current load on the processor 40 over the most recent pre-defined time period and the average load on the processor 40 over the most recent pre-defined time interval, both of which are stored in the integration array.

When the processing card 34 receives a request from another switch to set up a new call, therefore, the call rejection module 50 is able to determine relatively quickly whether to allow or reject the request based on the current load and the average load available from the load integrator 48. When the request is received, the call rejection module 50 compares the current load stored by the load integrator 48 to a load threshold. The load threshold may be stored in the call rejection module 50 or in any suitable component of the processing card 34.

If the current load is less than the load threshold, the call rejection module 50 allows the call to be set up. According to one embodiment, the processing card 34 sends an acknowledge message to the requesting switch to indicate that the request was allowed. However, if the current load is greater than or equal to the load threshold, the call rejection call module 50 will not allow the call based on the current load. In this situation, the call rejection module 50 compares the average load stored by the load integrator 48 to the load threshold.

If the average load is less than the load threshold, the call rejection module 50 allows the call to be set up, as described above. However, if the average load is greater than or equal to the load threshold, the call rejection module 50 rejects the request to set up the call. In rejecting the request, the call rejection module 50 sends a release message to the requesting switch to indicate that the request was rejected. Thus, the switch is notified relatively quickly that the call will not be set up, allowing the switch to make an informed decision as to how to proceed in a short amount of time.

Figure 3:
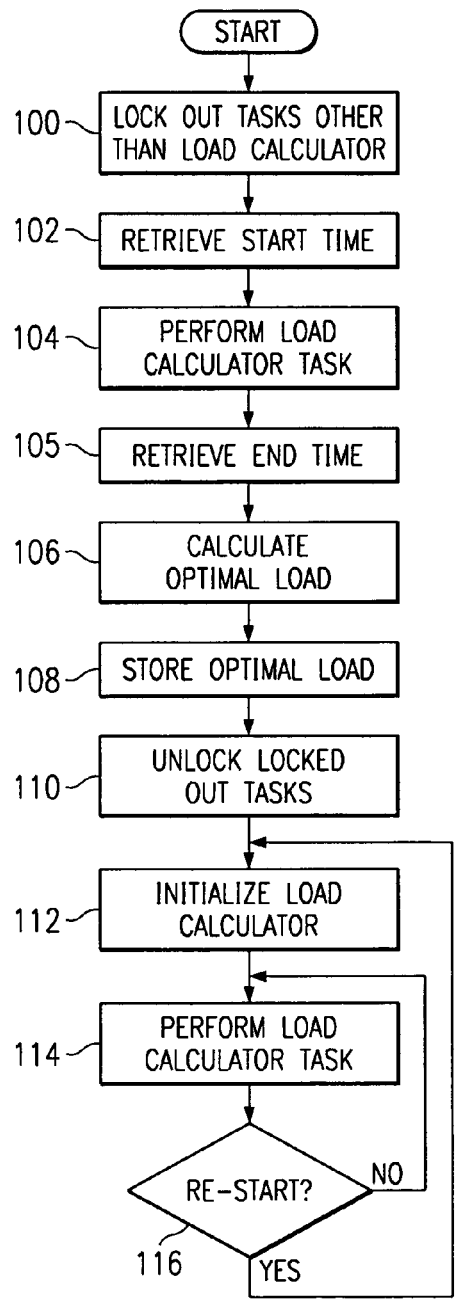
FIG. 3 is a flow diagram illustrating a method for calculating a current load for the ATM switch of FIG. 2 in accordance with one embodiment of the present invention.

FIG. 3 is a flow diagram illustrating a method for calculating a current load for the ATM switch 24 in accordance with one embodiment of the present invention. The method begins at step 100 where the load calculator 46 places the processor 40 in a calibration mode by locking out all tasks for the processing card 34 other than those performed by the load calculator 46. It will be understood, however, that the load calculator 46 may place the processor 40 into the calibration mode by locking out a specified subset of tasks without departing from the scope of the present invention.

At step 102, the load calculator 46 begins a calibration process by retrieving a start time for the calibration from the processor 40. At step 104, the load calculator 46 performs a load calculator task. The load calculator task comprises any task which may be performed repetitively by the load calculator 46 in order to determine a load for the processor 40. For example, the load calculator task may comprise a counter loop which increments a counter with each iteration. At step 105, the load calculator 46 ends the calibration process by retrieving an end time for the calibration from the processor 40.

At step 106, the load calculator 46 calculates an optimal load for the processor 40. According to one embodiment, the optimal load is calculated based on the start time, the number of times the load calculator task was performed, and the end time. For example, the optimal load may comprise the number of load calculator tasks performed per second. This optimal load is calculated by dividing the number of load calculator tasks performed by the load calculator 46 during the calibration process by the length of the calibration process, which is calculated by subtracting the start time from the end time. After calculating the optimal load, the load calculator 46 stores the optimal load in step 108.

At step 110, the load calculator 46 unlocks the tasks which were locked out in step 100, allowing the processor 40 to operate in a normal mode. At step 112, the load calculator 46 is initialized for operation in the normal mode. For example, in the embodiment in which the load calculator task comprises incrementing a counter, the counter may be set to zero at step 112. At step 114, the load calculator 46 performs the load calculator task, as described above in connection with step 104.

At decisional step 116, a decision is made regarding whether the load calculator 46 has received a re-start instruction from the load integrator 48. If the load calculator 46 has not received a re-start instruction, the method follows the No branch from decisional step 116 and returns to step 114 where the load calculator 46 continues to perform the load calculator task.

However, if the load calculator 46 has received a re-start instruction, the method follows the Yes branch from decisional step 116 and returns to step 112 where the load calculator 46 is re-initialized. In this way, the load calculator 46 may generate a result for the load integrator 48 which may be used to calculate a current load and an average load for the processor 40, as described in more detail below in connection with FIG. 4, allowing the processing card 34 to handle requests for call set-ups more efficiently.

Figure 4:
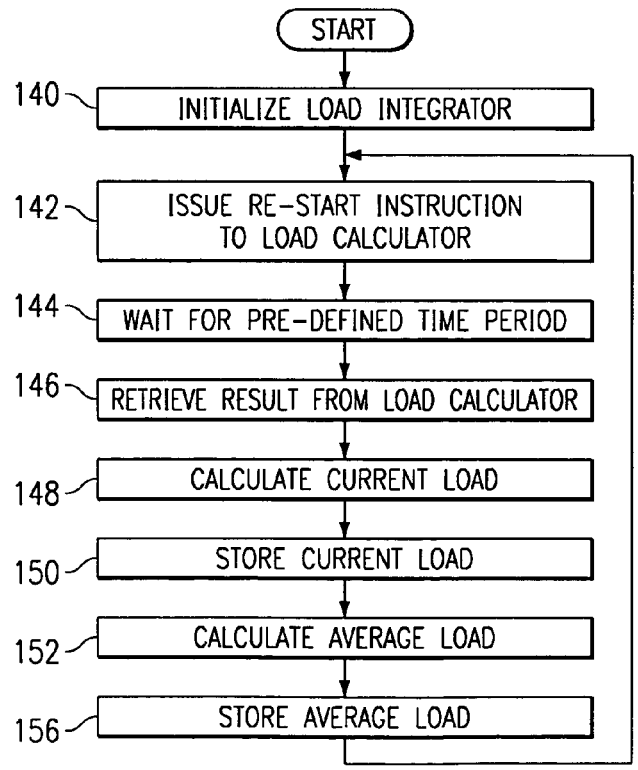
FIG. 4 is a flow diagram illustrating a method for calculating an average load for the ATM switch of FIG. 2 in accordance with one embodiment of the present invention.

FIG. 4 is a flow diagram illustrating a method for calculating an average load for the ATM switch 24 in accordance with one embodiment of the present invention. The method begins at step 140 where the load integrator 48 is initialized.

According to one embodiment, the load integrator 48 is operable to calculate an average load for a pre-defined time interval by averaging a plurality of loads for a number of shorter, pre-defined time periods. Thus, for example, each load may correspond to the load on the processor 40 over a time period of 0.1 seconds, while an average load may correspond to an average of the loads on the processor 40 over a time interval of five seconds. For this exemplary embodiment, the average load is based on the fifty most recent loads. It will be understood that the pre-defined time periods for calculating the loads and the pre-defined time intervals for calculating the average load may comprise any suitable amounts of time without departing from the scope of the present invention.

Thus, the load integrator 48 in the exemplary embodiment may comprise an integration array operable to store fifty loads, including forty-nine prior loads and one current load. However, it will be understood that the load integrator 48 may store the prior loads and the current load in any other suitable manner without departing from the scope of the present invention. The load integrator 48 may be initialized by filling the integration array with fifty estimated loads.

At step 142, the load integrator 48 issues a re-start instruction to the load calculator 46, causing the load calculator 46 to be initialized and to perform the load calculator task. At step 144, the load integrator 48 waits for a pre-defined time period. For the exemplary embodiment, this pre-defined time period is 0.1 seconds.

At step 146, the load integrator 48 retrieves a result from the load calculator 46 based on the load calculator task. For example, for the embodiment in which the load calculator task comprises incrementing a counter, the load integrator 48 retrieves the value of the counter at the end of the pre-defined time period. In an alternative embodiment, the load integrator 48 may receive the result from the load calculator 46. For this embodiment, the load calculator 46 provides this result to the load integrator 48 after receiving the re-start instruction from the load integrator 48.

At step 148, the load integrator 48 calculates the current load based on the pre-defined time period and the result from the load calculator 46. According to one embodiment, the current load is a percentage of the optimal load. Thus, for example, the current load may be calculated by first dividing the result from the load calculator 46 by the length of the pre-defined time period. The current load is then calculated by determining what percentage the result of the division is with respect to the optimal load. For example, if the optimal load is 500 tasks/second and the load calculator 46 performs 30 tasks in the 0.1 second time period, the current load would be (30/0.1)/500 or 60%. It will be understood, however, that the current load may be calculated in any suitable manner without departing from the scope of the present invention. For example, according to an alternative embodiment, the current load may be calculated by subtracting the previously described result from 100%. Thus, for the example described above, the current load would be 1–(30/0.1)/500 or 40%.

At step 150, the load integrator 48 discards the oldest prior load and stores the current load, as calculated in step 148, in the integration array. At step 152, the load integrator 48 calculates the average load. For the exemplary embodiment, the average load is calculated by averaging the fifty most recent loads, which are the forty-nine prior loads and the current load stored in the integration array. At step 156, the load integrator 48 stores the average load. The method then returns to step 142 where the load integrator 48 issues a re-start instruction to the load calculator 46 in order to begin the process for determining the next current load. In this way, the load integrator 48 may calculate and store a current load and an average load for the processor 40, allowing the processing card 34 to handle requests for call set-ups from other switches more efficiently.

Figure 5:
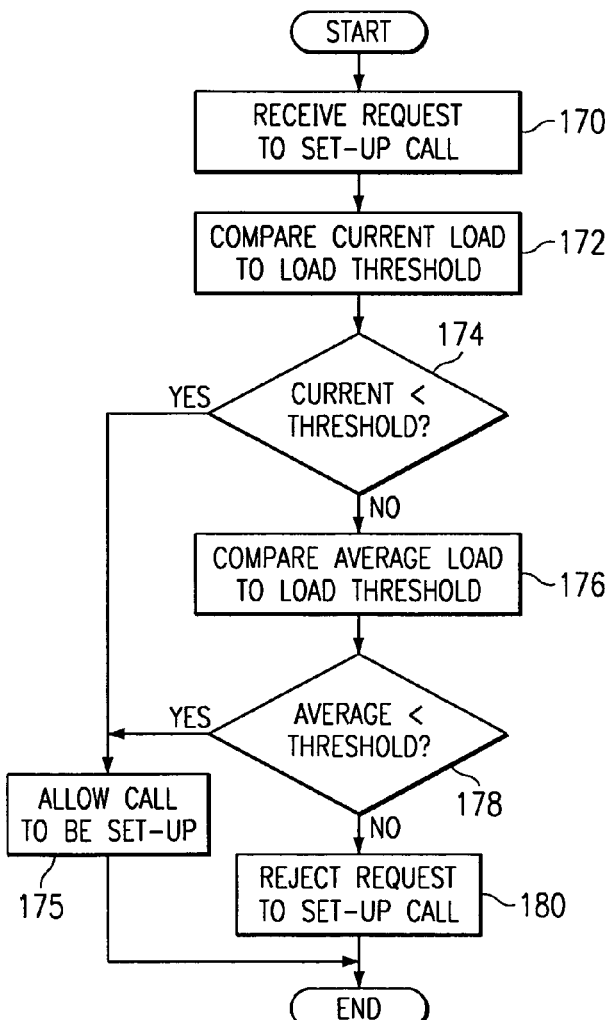
FIG. 5 is a flow diagram illustrating a method for handling requests for setting up calls for the ATM switch of FIG. 2 in accordance with one embodiment of the present invention.

FIG. 5 is a flow diagram illustrating a method for handling requests for setting up calls for the ATM switch 24 in accordance with one embodiment of the present invention. The method begins at step 170 where the processing card 34 receives a request from another switch to set up a new call. At step 172, the call rejection module 50 compares the current load stored by the load integrator 48 to a load threshold.

At decisional step 174, the call rejection module 50 determines whether the current load is less than the load threshold. If the current load is less than the load threshold, the method follows the Yes branch from decisional step 174 to step 175. At step 175, the call rejection module 50 allows the call to be set up and the method comes to an end.

However, if the current load is not less than the load threshold, the method follows the No branch from decisional step 174 to step 176. At step 176, the call rejection call module 50 compares the average load stored by the load integrator 48 to the load threshold.

At decisional step 178, the call rejection module 50 determines whether the average load is less than the load threshold. If the average load is less than the load threshold, the method follows the Yes branch from decisional step 178 to step 175 where the call rejection module 50 allows the call to be set up and the method comes to an end.

However, if the average load is not less than the load threshold, the method follows the No branch from decisional step 178 to step 180. At step 180, the call rejection module 50 rejects the request to set up the call. In rejecting the request, the call rejection module 50 sends a release message to the requesting switch. In this way, the switch is notified relatively quickly that the call will not be set up based on stored and thus readily available information regarding current and average loads on the processor 40. This allows the requesting switch to make an informed decision as to how to proceed in a relatively short amount of time.

Although the present invention has been described with several embodiments, various changes and modifications may be suggested to one skilled in the art. It is intended that the present invention encompass such changes and modifications as fall within the scope of the appended claims.

What is claimed is:

1. A method for handling call set-ups in a telecommunications network, comprising:
   receiving a request to set up a call;
   comparing a first load value for a switch to a load threshold for the switch;
   allowing the call to be set up when the first load value is less than the load threshold;
   comparing a second load value to the load threshold in response to the first load value being greater than or equal to the load threshold; and
   allowing the call to be set up when the second load value is less than the load threshold.

2. The method of claim 1, wherein the first load value comprises a current load value.

3. The method of claim 2, wherein the second load value comprises an average load value.

4. The method of claim 3, further comprising rejecting the request to set up the call when the current load value is greater than or equal to the load threshold and the average load value is greater than or equal to the load threshold.

5. A method for handling call set-ups in a telecommunications network, comprising:
   receiving a request to set up a call;
   comparing a first load value for a switch to a first load threshold for the switch;
   allowing the call to be set up when the first load value is less than the first load threshold;
   comparing a second load value to a second load threshold in response to the first load value being greater than or equal to the first load threshold; and
   allowing the call to be set up when the second load value is less than the second load threshold.

6. The method of claim 5, wherein the first load value comprises a current load value.

7. The method of claim 6, wherein the second load value comprises an average load value.

8. A method for handling traffic based on dynamic data for a switch, comprising:
   determining a first dynamic load for a switch processor;
   determining a second dynamic load for a switch processor;
   comparing the first dynamic load to a threshold;
   comparing the second dynamic load to a second threshold; and
   performing queue management for the switch processor based on the results of the comparisons.

9. The method of claim 8, wherein the first threshold and the second threshold comprise a same threshold.

10. A system for handling call set-ups in a telecommunications network, comprising:
    a load calculator operable to perform a load calculator task;
    a load integrator operable to calculate and store a current load value associated with a processor and operable to calculate and store an average load value associated with the processor; and
    a call rejection module operable to reject a request to set up a call based on the current load value and a load threshold.

11. The system of claim 10, the load calculator task comprising incrementing a counter.

12. The system of claim 10, the load integrator operable to calculate a current load value based on a result from the load calculator and an optimal load.

13. The system of claim 10, the load integrator further operable to store a plurality of load values and operable to calculate an average load value based on the current load value and a specified number of the plurality of load values.

14. The system of claim 10, the call rejection module operable to reject a request to set up a call when the current load value is greater than or equal to the load threshold.

15. The system of claim 10, the call rejection module operable to reject a request to set up a call based on the average load value and the load threshold.

16. The system of claim 15, the call rejection module operable to reject a request to set up a call when the average load value is greater than or equal to the load threshold.

17. An asynchronous transfer mode switch comprising: a plurality of line cards, each line card operable to receive a request to set up a call; and a processing card operable to reject the request to set up the call based on a current load value associated with a processor, a load threshold, associated with the processor, and an average load value associated with the processor, wherein the processing card comprises a load calculator operable to perform a load calculator task and a load integrator operable to calculate and store the current load value based on a result from the load calculator.

18. The switch of claim 17, wherein the processing card comprises a load calculator operable to perform a load calculator task and a load integrator operable to calculate and store the current load value based on a result from the load calculator.

19. The switch of claim 17, the processing card further operable to reject the request to set up the call based on the average load value and the load threshold.

20. The switch of claim 19, wherein the processing card comprises a load calculator operable to perform a load calculator task and a load integrator operable to store a plurality of load values, to calculate and store the current load value based on a result from the load calculator, and operable to calculate the average load value based on the current load value and a specified number of the plurality of load values.

* * * * *